(12) United States Patent
McCann

(10) Patent No.: US 6,375,711 B1
(45) Date of Patent: Apr. 23, 2002

(54) STEELMAKING USING MAGNESIUM CARBONATE

(76) Inventor: Dean McCann, 205 Athabascan Ave., Sherwood Park (CA), T8A 4C8

( * ) Notice: Subject to any disclaimer, the term of this patent is extended or adjusted under 35 U.S.C. 154(b) by 0 days.

(21) Appl. No.: 09/588,328

(22) Filed: Jun. 6, 2000

(30) Foreign Application Priority Data

Apr. 7, 2000 (CA) .............................................. 2304337

(51) Int. Cl.⁷ ............................ C22B 7/04; C21B 7/076
(52) U.S. Cl. ............................................. 75/570; 65/20
(58) Field of Search ................................ 75/570; 65/20

(56) References Cited

U.S. PATENT DOCUMENTS

| | | | | |
|---|---|---|---|---|
| 4,217,133 A | * | 8/1980 | Goto et al. ................... | 75/312 |
| 4,447,265 A | * | 5/1984 | Schwer ........................ | 75/306 |
| 4,528,035 A | | 7/1985 | Simpson, Jr. et al. | |
| 5,279,639 A | | 1/1994 | Kemeny et al. | |
| 5,681,367 A | * | 10/1997 | Hunter ....................... | 75/10.48 |
| 5,882,375 A | * | 3/1999 | Edlinger et al. ............ | 75/10.35 |
| 6,235,083 B1 | * | 5/2001 | Kepplinger et al. .......... | 75/492 |

FOREIGN PATENT DOCUMENTS

| | | |
|---|---|---|
| CA | 1215235 | 12/1986 |
| CA | 1321075 | 8/1993 |

* cited by examiner

*Primary Examiner*—Roy King
*Assistant Examiner*—Tima McGuthry-Banks
(74) *Attorney, Agent, or Firm*—Bennett Jones LLP

(57) ABSTRACT

The present invention provides methods and compositions for steelmaking using magnesium carbonate to create a foaming primary slag.

7 Claims, No Drawings

STEELMAKING USING MAGNESIUM CARBONATE

PRIORITY CLAIM

This application claims the priority benefit of Canadian Application No. 2,304,337 filed on Apr. 7, 2000 as file no. 45082.1 and entitled Steelmaking Using Magnesium Carbonate.

FIELD OF THE INVENTION

The present invention relates to a method for creating a foaming slag in a primary steelmaking vessel.

BACKGROUND OF THE INVENTION

Steel making is often a batch procedure involving several steps. Molten metal is continuously produced in a blast furnace to produce molten iron. The molten iron is transported in batches to a primary steelmaking vessel and is transformed into steel by blowing oxygen to remove carbon and phosphorus. The steel is usually formed in the presence of a primary slag which floats on the surface of the molten steel and is mostly comprised of oxides of calcium, silicon, iron, manganese, phosphorus, chromium and aluminum.

The primary steelmaking vessel may be an electric arc furnace which uses an electric arc to heat the molten iron or melt scrap steel to produce steel. It is desirable to have longer arcs to increase the temperature in the vessel, thereby decreasing the melting time of the process. However, longer arcs may result in increased arc instability or arc flaring. Arc instability or arc flare may cause consumption of the electrodes and cause hot gases and slag to be propelled against the refractory lining of the furnace, resulting in damage to or wear of the refractory lining.

It is well-known to reduce arc flare by producing a foaming slag in a primary arc furnace in an effort to bury the arc within the slag. For example, both U.S. Pat. Nos 4,447,265 and 4,528,035 describe procedures using the injection of carbon, lime, calcium dioxide and oxygen into a primary steelmaking vessel to produce a foaming slag. The carbon and oxygen react to form either carbon dioxide or monoxide which results in the foaming action. The lime is necessary to raise the slag viscosity because the foaming action will not occur if the slag viscosity is too low.

This process is expensive because of large amounts of relatively pure carbon and oxygen gas are required. The carbon source must be a relatively pure source of carbon such as metallurgical coke or anthracite coal. If the carbon source contains hydrogen or nitrogen impurities as is the case with petroleum coke or bituminous coal, the steel product may be compromised or yields may be reduced because hydrogen and nitrogen are soluble in steel at elevated temperatures. It would be an economic advantage to be able to reduce the amount and/or quality of the carbon source used to produce a foaming primary slag.

The addition of magnesium oxide (MgO) either as pure MgO or in the form of dolomitic lime to the primary slag is also well-known. Because the refractory lining material typically bears MgO, its addition to the primary slag may decrease refractory lining wear. The MgO added to the furnace is typically added very early in the heat because the equipment used to add the MgO is also used to add carbon as the process continues. This results in a higher than required MgO level early in the heat and may result in a MgO-deficient slag later in the process. While some MgO in the primary slag is desirable, too much MgO may be detrimental to subsequent desulphurization processes in secondary steel refining. It would be advantageous to be able to control MgO levels during the heat while controlling the formation of a foaming slag at the same time.

Furthermore, MgO is produced by calcining $MgCO_3$ which releases $CO_2$ directly into the atmosphere. As well, the heat necessary to calcine $MgCO_3$ is obtained by burning fossil fuels. The release of $CO_2$ is not desirable as it is a greenhouse gas which may cause global warming. It would be advantageous to eliminate the need to separately produce calcined MgO for use in the steelmaking process.

Therefore, there is a need in the art for a method and composition for producing a foaming slag in a primary electric arc furnace which mitigates the difficulties of the prior art.

SUMMARY OF THE INVENTION

The invention provides for methods and compositions for steelmaking using magnesium carbonate ($MgCO_3$). In one aspect of the invention, the invention comprises a method of generating a foaming primary slag comprising the step of injecting an effective amount of a composition into a primary steelmaking furnace wherein said composition comprises at least about 30% $MgCO_3$. The composition may further comprise a suitable carbon source. In one embodiment of the method, the composition used may comprise about 30% to about 100% $MgCO_3$ and about 0% to about 70% carbon source. The carbon source may be chosen from chosen from the group comprising anthracite coal and metallurgical coke. In another embodiment of the method, the composition used may comprise about 65% to about 100% $MgCO_3$ and about 0% to about 35% carbon source, in which case a lower grade of carbon source may be used. Alternatively, the composition may further comprise a small amount of CaO. in an amount preferably not exceeding about 20% of the composition.

In another aspect of the invention, the invention comprises a composition for injecting into a primary steelmaking furnace for generating a foaming primary slag, said composition comprising at least about 30% $MgCO_3$. The composition may further comprise a suitable carbon source. In one embodiment, the composition may comprise about 30% to about 100% $MgCO_3$ and about 0% to about 70% carbon. The carbon source may be chosen from the group comprising anthracite coal and metallurgical coke. In another embodiment of the composition, the composition may comprise about 65% to about 100% $MgCO_3$ and about 0% to about 5% carbon source, in which case a lower grade of carbon source may be used. Alternatively, the composition may further comprise CaO, preferably in an amount not exceeding about 20%.

DETAILED DESCRIPTION OF THE INVENTION

The present invention provides for methods and compositions for producing a foaming primary slag. When describing the present invention, the following terms have the following meanings, unless indicated otherwise. All terms not defined herein have their common art-recognized meanings.

A. Definitions

The term "effective amount" refers to an amount of composition required to produce a foaming slag having a depth sufficient to have a beneficial effect on arc stability in an electric arc furnace.

The term "electric arc furnace" or "primary steelmaking vessel" refers to a steelmaking vessel in which electrical arcing between electrodes generates sufficient heat to melt scrap steel or iron.

The term "heat" refers to a batch of steel making commencing with initial melt down of the scrap steel or iron charge and ending with the tapping of the heat.

B. Description

The novel compositions of the present invention comprise particulate $MgCO_3$ which may be introduced into an electric arc furnace by a method of the present invention. At steelmaking temperatures, the $MgCO_3$ decomposes to MgO and $CO_2$. The MgO becomes part of the primary slag while the $CO_2$ causes the slag to foam. The compositions should comprise at least about 30% by weight of $MgCO_3$, with the remainder, if any, being comprised of a carbon source and CaO, if any.

The decomposition of $MgCO_3$ is an endothermic reaction. As a result, its injection into the furnace raises the viscosity of the slag such that the slag may be foamed without the addition of lime or dolomitic lime. However, if CaO is a desired component of the primary slag, a small amount of lime or dolomitic lime may be added.

The compositions comprising particulate $MgCO_3$ may be injected into the furnace using conventional carbon injectors which are well-known in the art. Particulate $MgCO_3$ may be produced from raw $MgCO_3$ rock by crushing the rock to a suitable size for injection and drying the crushed rock to remove excess moisture. In one example, raw $MgCO_3$ was crushed to a particle size of less than about 13 mm using a jaw-type crusher. Then, using a roll-type crusher, the particles were further reduced in size to less than about 3 mm. The material was then screened to ensure a maximum size of about 3 mm and a minimum size of about 0.10 mm and dried in an indirect flame rotary drier to a moisture content less than 0.5%.

The desired size of the $MgCO_3$ particles is dictated by the specific means of injecting or introducing the $MgCO_3$ into the furnace. In the example above, the $MgCO_3$ was destined to be injected using standard carbon injectors. Such injectors may not operate efficiently if the particle size is too fine. As a result, if using such injectors, the resulting particulate material should be rescreened if the level of fine particles is unacceptable. Also, if the particle size is too fine, the particles may be swept into the dust collector system rather than into the molten steel.

It may be necessary or desirable to add a carbon source to achieve a desired level of foaming action. Accordingly, in one embodiment of the invention, the composition may also comprise from about 0% to about 70% by weight of a carbon source. In one preferred embodiment, the composition may comprise from about 5% to about 35% of a carbon source. In a particularly preferred embodiment, the composition comprises about 30% of a carbon source.

Although it is preferred to use relatively pure sources of carbon such as metallurgical coke or anthracite coal, it may be possible to use lower grades of carbon source if lesser amounts of the source are added in the present invention. In one example, where the composition comprises less than about 35% of the carbon source, lower grades of carbon may be used such as petroleum coke or bituminous coal.

Therefore, the compositions of the present invention may comprise:

| | |
|---|---|
| $MgCO_3$ | about 30% to about 100% (w:w) |
| Carbon | about 0% to about 70% (w:w) |
| CaO | about 0% to about 20% (w:w) |

In one embodiment, the composition comprises from about 65% to about 95% $MgCO_3$ with the remainder consisting substantially of carbon. In another embodiment, the composition comprises about 70% $MgCO_3$ with the remainder consisting substantially of carbon.

An additional oxygen source is not necessary because of the oxygen content of the $MgCO_3$, eliminating the need for oxygen injection and/or additional oxygen source material such as FeO or MnO. Although an additional oxygen source is unnecessary, its presence is not detrimental to the present invention and may be included in a process incorporating the present invention.

The compositions may be injected in a continuous manner during the heat in an effective amount to produce the foaming slag. In one example the composition may be injected once a molten bath is established and injected continuously until an effective amount is established. An effective amount may range from about 7 pounds per ton of steel to about 15 pounds per ton. In one embodiment, an effective amount may be about 10 pounds per ton.

As will be apparent to those skilled in the art, various modifications, adaptations and variations of the foregoing specific disclosure can be made without departing from the scope of the invention claimed herein.

What is claimed is:

1. A method of generating a foaming primary slag comprising the step of injecting an effective amount of a composition into a primary steelmaking furnace wherein said composition comprises at least about 30% $MgCO_3$ by weight.

2. The method of claim 1 wherein the composition further comprises carbon.

3. The method of claim 2 wherein said composition comprises about 30% to about 100% $MgCO_3$ by weight and about 0% to about 70% carbon by weight.

4. The method of claim 2 wherein said carbon comprises anthracite coal or metallurgical coke.

5. The method of claim 3 wherein said composition comprises about 65% to about 100% $MgCO_3$ by weight and about 0% to about 35% carbon by weight.

6. The method of claim 5 wherein the carbon comprises petroleum coke or bituminous coal.

7. The method of claim 1 wherein the composition further comprises CaO in an amount not exceeding about 20% of the composition by weight.

\* \* \* \* \*